Figure 1:
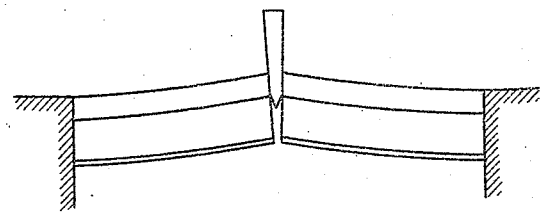

W. BREWITT.
PROCESS OF WELDING RAILS OR THE LIKE.
APPLICATION FILED NOV. 8, 1913.

1,167,043.

Patented Jan. 4, 1916.

Witnesses:

Inventor
his Attorney.

UNITED STATES PATENT OFFICE.

WALTER BREWITT, OF ESSEN-ON-THE-RUHR, GERMANY, ASSIGNOR TO GOLDSCHMIDT THERMIT COMPANY, OF NEW YORK, N. Y., A CORPORATION OF NEW JERSEY.

PROCESS OF WELDING RAILS OR THE LIKE.

1,167,043.      Specification of Letters Patent.      Patented Jan. 4, 1916.

Application filed November 8, 1913. Serial No. 799,892.

*To all whom it may concern:*

Be it known that I, WALTER BREWITT, subject of the King of Prussia, and resident of Essen-on-the-Ruhr, in the Province of the Rhine, Germany, have invented certain new and useful Improvements in the Process of Welding Rails or the like, of which the following is an exact specification.

In the process of welding rails, which are laid in a paved roadsurface, a contraction of the track takes place in consequence of the upsetting of the rail ends resulting from the heating of the latter and owing to the shrinkage caused by the succeeding cooling of the joint. The tensions produced by this shrinkage are frequently the cause of rail breakages. There are already different processes carried out to avoid such an upsetting of the rail ends. One of them consists in filling up the joint with liquid iron resulting for instance from an aluminothermic reaction. In another the rail ends are welded by means of an electrical luminous arc. A third method consists in pressing a metal piece into the space between the rail-ends, during the welding operation in order to equalize by such an addition of material the contraction caused by the upsetting. Furthermore, attempts have been made to prevent the upsetting by force, by adjusting the space between the rails by means of a clamping apparatus or the like, so that the surfaces to be united did not come into contact with one another before the highest welding temperature was obtained, thereby keeping the pressure upon the surfaces so low, that no upsetting and consequently no contraction took place. With all these processes whether with or without upsetting, it was not possible to wholly remove the contraction, which was the consequence of the shrinkage caused by the cooling of the joint. Besides this disadvantage, another error was made in carrying out the last mentioned welding process, as the welding surfaces were not brought into contact before the highest necessary temperature was reached. Under such circumstances deposits of oxid were produced on the welding surfaces as soon as the heating began. These oxids prevent a strong metallic union of the rail-ends. Consequently this process could not be carried out in practice on a large scale. These disadvantages are avoided by a new process which is the subject matter of the present invention. It is based upon the exact determination of the amount of shrinkage of a welded rail joint. This amount cannot be determined by calculation because the circumstances under which the heat is led away from the joint to adjacent parts of the rail-ends is still unknown. The amount of shrinkage could only be determined up to the present time if loose rails were to be welded by means of a clamping apparatus which allowed a free contraction of the rails so that the formation of tensions by cooling was impossible. In carrying out this method the rails must be guided by force in a straight line and the surfaces must be previously faced to exact parallelism, otherwise the rail-ends alter their elevation or their position in lateral direction and break. Wrong bends or misplacements of their ends are produced, so that it is very difficult to exactly determine the true amount of the shrinkage. Only by the use of newly disclosed mechanisms was it possible to avoid these disadvantages and to determine the correct amount of shrinkage of the rail-ends. This determination is taken into consideration in the present process of welding rails which are tightly held in an unmovable position.

According to the present process the space between the rail-ends is enlarged by forcing for instance a flat steel wedge from the side between the webs of the rail-ends below the rail heads in such a manner that the end surfaces are moved parallel in the direction of the longitudinal axis of the rails. By thus forcing the wedge into the space between the rail-ends an elastic tension will be produced in the tightly-held rails. However, this tension does not go beyond the elastic limit. The parallel displacement of the sectional surfaces renders possible an exact parallel facing of these surfaces in the space produced by the aforesaid enlargement. This facing being finished the width of the space will be so adjusted by pressing the wedge into the space or by drawing it back that the width corresponds with the necessary amount of upsetting or shrinkage.

This amount must be preliminarily determined by experiments, for instance by welding loose rails by means of a clamping apparatus. After this adjustment a suitable piece of metal of good weldability is inserted into the space between the rail-heads from above until it comes into contact with the wedge. If now the wedge is withdrawn, the rails move together by the influence of the elastic tension and inclose or squeeze together the inserted metal piece. The metallic bright and parallel welding surfaces are therefore closely pressed against the metal piece so that they are prevented from oxidation before the heating commences. The joint prepared in this manner can afterward easily be welded without the use of a special clamping device, for instance by the aluminothermic process in such a manner that foot and web are fused together by pouring aluminothermic iron around them whereas the heads are closely united by an upsetting produced by the elastic pressure. As the space between the rail-ends was enlarged beforehand an amount depending upon the amount of upsetting and shrinkage, it follows that the joint after being cooled will be either without any tension or still be under a small pressure tension which however is an advantage with respect to the durability of the welded joint. If the end surfaces are moved in the above described manner, certain disadvantages may arise, which render a successful welding very difficult. This is exemplified in the accompanying drawing, in which:—

Figure 2:
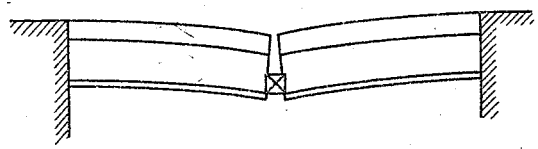
Figure 3:
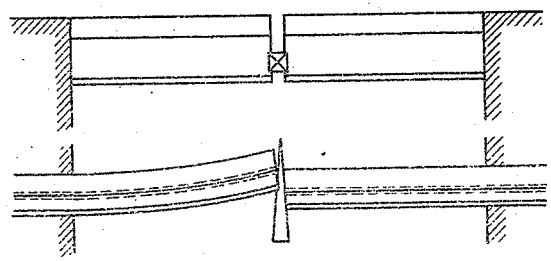
Figure 4:
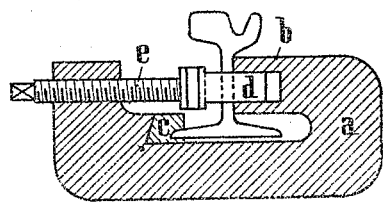

Figure 1 is a more or less diagrammatic side elevation, partly in section, illustrating the disadvantages of inserting a wedge between the rail ends from above when no holding device is used on the rails; Figs. 2 and 3 are similar views showing the disadvantages of inserting the wedge between the rail ends from the bottom and side respectively, when no holding device is used on the rails; and Fig. 4 is an end elevation of a rail end showing in transverse section, a holding device for overcoming the disadvantages illustrated in Figs. 1 to 3.

Referring to the drawing, it will be seen that if a wedge is driven between the rail-heads from above, the rail-ends will rise over their normal horizontal position as shown in Fig. 1 of the annexed drawing, if the wedge is driven between the feet of the rail-ends from below, the joint sinks under the tread of the rail as shown in Fig. 2 of the drawing, and if the wedge is driven from the side between the webs, the end surfaces are distorted and displaced as seen in Fig. 3. These disadvantages can be avoided by means of a holding device which renders each of the above movements of the rail-ends impossible. This holding device causes the rails to move in a straight line when the wedge is being forced between the rail ends. Such a device is shown by way of example in Fig. 4 of the drawing. It is composed of a frame $a$ inclosing the rail feet from below and a projection $b$ serving as support for the webs of the rail-ends. Opposite to this projection the frame $a$ is provided with a guide $c$ for the rail feet. These parts prevent the rail-ends from being turned or moved out of their ordinary horizontal position. Besides these parts the frame $a$ carries the mechanism for moving the wedge $d$. This wedge is connected with a screw $e$ passing through an upper part of the frame $a$. By turning the screw in one or the other direction the wedge is either forced between the end surfaces of the rails or removed therefrom. In order to render the forcing of the wedge $d$ into the rail joint possible, the projection $b$ of the frame $a$ is provided with a groove or a recess as shown in the drawing. If the wedge $d$ is moved in the manner just described, the rail-ends can only move in a straight line in the frame $a$, so that they do not leave the level of the tread, that is to say the exact parallelism of the rails is absolutely maintained. The frame $a$, made of one piece in the example shown in the drawing, can also be fork-shaped or box-shaped, so that it may easily be laid over the rail heads around the joint without preventing the accessibility of the joint from above. In this mode of forming the frame $a$ the wedge $e$ may be applied on another spot for instance among the rail head upon both sides of the joint. The frame $a$ may also have the shape of a one-sided fish-plate and coöperate with the wedge $d$ in such a manner that this wedge enters the space between the rail-ends from below. In this arrangement the projection $b$ must consequently be pressed from above toward the rail head and the rail foot.

Having now particularly described and ascertained the nature of my said invention and in what manner the same is to be performed, I declare that what I claim is:

1. A process of welding rails or the like consisting in pressing the ends of unmovably held rails back for an amount corresponding to their contraction after welding, inserting a piece of metal into the space, allowing the rail-ends to return sufficiently to grip said piece of metal owing to their elastic tension and then welding the rail-ends together.

2. A process of welding rails or the like consisting in pressing the ends of unmovably held rails back for an amount corresponding to their contraction after welding by forcing a wedge into the space, applying suitable means for producing a straight-line movement of the tread of the rails, inserting a piece of metal above the wedge, allowing the rail-ends to return sufficiently to grip said piece of metal owing to their elastic tension by loosening the wedge and then welding the rail-ends together.

3. The process of welding rails or the like, consisting in pressing the ends of the rails back for an amount corresponding to their contraction after welding and holding the rails in such position by means of a piece of metal inserted between the rail ends, and then welding said piece of metal together with the rail ends.

WALTER BREWITT. [L. S.]

Witnesses:
 HELEN NUFER,
 ALFRED NUFER.